United States Patent
Suzuki et al.

(10) Patent No.: US 11,354,815 B2
(45) Date of Patent: Jun. 7, 2022

(54) MARKER-BASED AUGMENTED REALITY SYSTEM AND METHOD

(71) Applicant: Samsung Electronics Co., Ltd., Suwon-si (KR)

(72) Inventors: Masaki Suzuki, Sunnyvale, CA (US); Sergio Perdices-Gonzalez, Sunnyvale, CA (US); Pranav Mistry, Saratoga, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/209,864

(22) Filed: Dec. 4, 2018

(65) Prior Publication Data

US 2019/0362516 A1 Nov. 28, 2019

Related U.S. Application Data

(60) Provisional application No. 62/675,458, filed on May 23, 2018.

(51) Int. Cl.
*G09G 5/00* (2006.01)
*G06T 7/70* (2017.01)
(Continued)

(52) U.S. Cl.
CPC .............. *G06T 7/70* (2017.01); *G02B 27/017* (2013.01); *G06K 9/6215* (2013.01);
(Continued)

(58) Field of Classification Search
None
See application file for complete search history.

(56) References Cited

U.S. PATENT DOCUMENTS 9,754,417 B2* 9/2017 Matsubayashi ....... G06T 19/006
10,002,442 B1* 6/2018 Dagley ..................... G06T 7/73
(Continued)

FOREIGN PATENT DOCUMENTS

| KR | 1020160054441 A | 5/2016 |
|---|---|---|
| WO | 2014107681 A1 | 7/2014 |
| WO | 2018032084 A1 | 2/2018 |

OTHER PUBLICATIONS

International Search Report dated Aug. 29, 2019 in connection with International Patent Application No. PCT/KR2019/006108, 3 pages.
(Continued)

*Primary Examiner* — Anh-Tuan V Nguyen

(57) ABSTRACT

The present disclosure describes a system and method for a marker-based augmented reality system. The method includes acquiring image data from a camera, analyzing the image data to identify at least one marker, the at least one marker being associated with a physical location in a real-world environment, determining information represented via the at least one marker, the information represented via the at least one marker including at least one of content data, metadata, or server data, generating content based on the at least one of the content data, the metadata, or the server data, and presenting, via a display, the content overlaying a displayed representation of the real-world environment, the content being presented at one or more locations in the displayed representation of the real-world environment relative to the physical location associated with the at least one marker.

11 Claims, 14 Drawing Sheets

(51) Int. Cl.
  *G06T 19/00* (2011.01)
  *G06K 9/62* (2022.01)
  *G02B 27/01* (2006.01)
  *G06T 19/20* (2011.01)

(52) U.S. Cl.
  CPC ............ *G06T 19/006* (2013.01); *G06T 19/20* (2013.01); *G06T 2207/30204* (2013.01)

(56) References Cited

U.S. PATENT DOCUMENTS

| | | | | |
|---|---|---|---|---|
| 2006/0265242 | A1* | 11/2006 | Kashioka | H04N 1/00968 382/100 |
| 2008/0075077 | A1* | 3/2008 | Roy | H04L 67/16 370/390 |
| 2009/0292980 | A1* | 11/2009 | Swineford | G11B 27/031 715/202 |
| 2009/0324015 | A1* | 12/2009 | Way | G06K 9/4661 382/103 |
| 2011/0248995 | A1* | 10/2011 | Vaughan | G06T 19/006 345/420 |
| 2012/0105447 | A1 | 5/2012 | Kim | |
| 2012/0108332 | A1* | 5/2012 | Baseley | A63F 13/213 463/31 |
| 2012/0327117 | A1 | 12/2012 | Weller et al. | |
| 2013/0147838 | A1* | 6/2013 | Small | G02B 27/017 345/633 |
| 2013/0201217 | A1* | 8/2013 | Morinaga | G06K 9/3216 345/633 |
| 2013/0222427 | A1 | 8/2013 | Heo et al. | |
| 2013/0342572 | A1* | 12/2013 | Poulos | G02B 27/017 345/633 |
| 2014/0152550 | A1* | 6/2014 | Beall | G06F 3/012 345/156 |
| 2015/0062163 | A1 | 3/2015 | Lee et al. | |
| 2015/0062167 | A1 | 3/2015 | Park et al. | |
| 2015/0116358 | A1* | 4/2015 | Choi | H04N 19/27 345/633 |
| 2015/0117831 | A1* | 4/2015 | Hanai | G11B 31/006 386/224 |
| 2015/0156560 | A1 | 6/2015 | Choi et al. | |
| 2015/0188984 | A1* | 7/2015 | Mullins | G06T 19/006 709/219 |
| 2015/0302639 | A1* | 10/2015 | Malekian | H04L 67/42 345/420 |
| 2015/0302649 | A1* | 10/2015 | Komatsu | G06T 19/006 345/633 |
| 2016/0054441 | A1 | 2/2016 | Kuo et al. | |
| 2016/0247320 | A1* | 8/2016 | Yuen | G06T 19/006 |
| 2016/0307371 | A1* | 10/2016 | Ayers | G06T 19/006 |
| 2017/0031360 | A1* | 2/2017 | Reigo | A01D 34/008 |
| 2017/0061700 | A1* | 3/2017 | Urbach | H04N 13/344 |
| 2017/0116644 | A1 | 4/2017 | Huang et al. | |
| 2017/0118374 | A1* | 4/2017 | Tsujiguchi | H04N 1/32133 |
| 2017/0132806 | A1* | 5/2017 | Balachandreswaran | G06K 9/623 |
| 2017/0243064 | A1* | 8/2017 | Simari | G06K 9/3208 |
| 2017/0243403 | A1 | 8/2017 | Daniels et al. | |
| 2017/0330377 | A1 | 11/2017 | Akselrod et al. | |
| 2017/0366805 | A1* | 12/2017 | Sevostianov | H04N 13/366 |
| 2017/0372140 | A1* | 12/2017 | Someya | G06T 19/006 |
| 2017/0374294 | A1 | 12/2017 | Osman | |
| 2018/0025544 | A1* | 1/2018 | Schoeller | G06K 9/3208 345/633 |
| 2018/0082482 | A1* | 3/2018 | Motta | G06F 1/163 |
| 2018/0120936 | A1 | 5/2018 | Keller et al. | |
| 2018/0182169 | A1* | 6/2018 | Petro | G06T 19/006 |
| 2018/0211404 | A1* | 7/2018 | Zhu | G06T 7/70 |
| 2018/0239144 | A1* | 8/2018 | Woods | A63F 13/212 |
| 2018/0311555 | A1* | 11/2018 | Danis | A63B 60/16 |
| 2018/0325621 | A1* | 11/2018 | Srimohanarajah | A61B 34/00 |
| 2019/0037263 | A1* | 1/2019 | Nakano | H04N 21/4755 |
| 2019/0172221 | A1* | 6/2019 | Weller | G06T 7/73 |
| 2019/0213792 | A1* | 7/2019 | Jakubzak | G06F 3/017 |
| 2019/0272027 | A1* | 9/2019 | Loffler | G06F 3/011 |
| 2019/0279524 | A1* | 9/2019 | Stoyanov | G06K 9/00751 |
| 2019/0294936 | A1* | 9/2019 | Saez Mart Nez | G06K 19/06037 |
| 2019/0318404 | A1* | 10/2019 | LaMontagne | G06Q 30/0643 |

OTHER PUBLICATIONS

Written Opinion of the International Searching Authority dated Aug. 29, 2019 in connection with International Patent Application No. PCT/KR2019/006108, 5 pages.

Supplementary European Search Report in connection with European Application No. 19807084.9 dated Mar. 16, 2021, 11 pages.

Etienne, "AR-Code: a Fast Path to Augmented Reality," <URL: https://medium.com/arjs/ar-code-a-fast-path-to-augmented-reality-60e51be3cbdf>, Apr. 4, 2017, 6 pages.

\* cited by examiner

MARKER-BASED AUGMENTED REALITY SYSTEM AND METHOD

CROSS-REFERENCE TO RELATED APPLICATION(S) AND CLAIM OF PRIORITY

This application claims priority under 35 U.S.C. § 119(e) to U.S. Provisional Patent Application No. 62/675,458 filed on May 23, 2018. The above-identified provisional patent application is hereby incorporated by reference in its entirety.

TECHNICAL FIELD

This disclosure relates generally to computer vision and augmented reality. More specifically, this disclosure relates to a method and system for generating augmented reality content based on detection of markers placed in a physical environment.

BACKGROUND

As mobile devices such as smartphones have become increasingly ubiquitous, the creation of dynamic video recordings by amateur videographers has increased accordingly. For various video applications such as video stabilization, stitching, and segmentation, the ability to identify static background portions of a video is important. For dynamic videos with a large portion of the foreground occupied by one or more moving foreground objects and a constantly changing background, existing strategies for static background identification mis-identify the background portions and over-segment the video into more than foreground and background objects.

SUMMARY

This disclosure provides a system and method for generating augmented reality content based on detection of markers placed in a physical environment.

In a first embodiment, a method includes acquiring image data from a camera, analyzing the image data to identify at least one marker, the at least one marker being associated with a physical location in a real-world environment, determining information represented via the at least one marker, the information represented via the at least one marker including at least one of content data, metadata, or server data, generating content based on the at least one of the content data, the metadata, or the server data, and presenting, via a display, the content overlaying a displayed representation of the real-world environment, the content being presented at one or more locations in the displayed representation of the real-world environment relative to the physical location associated with the at least one marker.

In a second embodiment, an electronic device includes a camera, a display, and a processor operably coupled to the camera and the display. The processor is configured to acquire image data from the camera, analyze the image data to identify at least one marker, the at least one marker being associated with a physical location in a real-world environment, determine information represented via the at least one marker, the information represented via the at least one marker including at least one of content data, metadata, or server data, generate content based on the at least one of the content data, the metadata, or the server data, and present, via the display, the content overlaying a displayed representation of the real-world environment, the content being presented at one or more locations in the displayed representation of the real-world environment relative to the physical location associated with the at least one marker.

In a third embodiment, a non-transitory computer readable medium embodies a computer program, the computer program comprising computer readable program code that when executed causes at least one processor to acquire image data from the camera, analyze the image data to identify at least one marker, the at least one marker being associated with a physical location in a real-world environment, determine information represented via the at least one marker, the information represented via the at least one marker including at least one of content data, metadata, or server data, generate content based on the at least one of the content data, the metadata, or the server data, and present, via the display, the content overlaying a displayed representation of the real-world environment, the content being presented at one or more locations in the displayed representation of the real-world environment relative to the physical location associated with the at least one marker.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
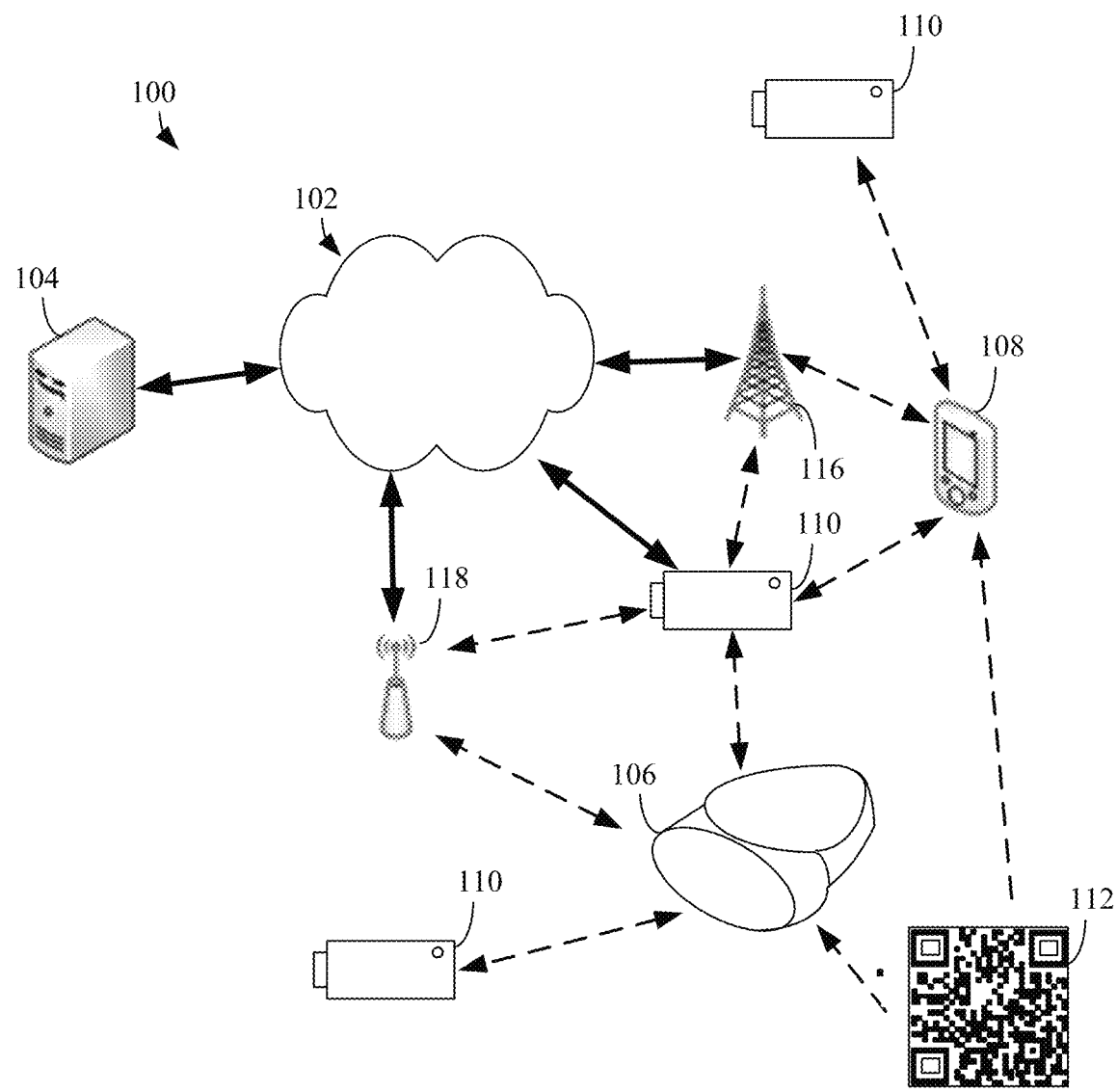
FIG. 1 illustrates an example system according to embodiments of this disclosure.

FIGS. 1 through 12, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

With the increasing ubiquity of mobile computing devices, including mobile phones and head-mountable devices or head-mounted devices (HMDs), augmented reality (AR) applications are in demand. AR applications allow for the display of content that is overlaid on a representation of the real world environment surrounding the AR device. For example, a mobile device or HMD can provide AR experiences by displaying, on a display, an image or video feed of the real world as captured by a camera on the device, with content such as labels, pictures, 3D models, or the like overlaid on the representation. Such an embodiment could function through a display of a smart phone or a display of an HMD that encloses a user's eyes but has an external camera. In another example, an HMD can provide a display overlaid on a transparent lens (for example, by using a miniature projection device to project the display onto the transparent lens) such that a user is directly viewing the real world environment through the lens with the content of the display overlaid on the real world environment.

Embodiments of this disclosure contemplate that information used to dynamically generate content for AR applications can be provided to mobile devices by markers placed in the physical environment. Such markers could include, for example, passive markers such as drawings or markings (e.g., a quick response (QR) code) on a surface, or active markers such as devices that include light sources (including infrared or visible light emitting diodes (LEDs)). A camera of the mobile device can capture an image or a video feed of the marker, and can interpret the marker and retrieve the information contained in the marker, which can be used to generate content for display via an AR application. For simplicity, embodiments of the present disclosure will be discussed in the context of an HMD, but it is understood that other types of mobile devices, such as a smart phone, can be used with embodiments of the disclosure.

The information provided by the marker can be used directly by the HMD to generate content for an AR application. For example, the information can include content data that specifies parameters of an image or 3D object to display, and/or metadata that specifies position and size of the content, text or other information to display, or the like. The HMD can then interpret this information to generate content for display. The information provided by the marker can additionally, or alternatively, include information that specifies a third party source of content (e.g., a server IP address, a BLUETOOTH ID, etc.). For example, the information provided by the marker can specify a server IP address, the HMD can connect to the server at the specified address via a wireless communication protocol, and the server can in turn provide the HMD with dynamically generated content, such as an advertisement, streaming video, or the like, to be displayed by the AR application. The third party source of content can, in some embodiments, include an edge computing node that is located geographically near the marker.

In some embodiments, the marker is self-contained. For example, the marker can be a low-power, battery-powered device that is pre-configured with information to be optically transmitted to HMDs via an LED. It is understood that the marker can broadcast this information to any HMDs within range, and that references to a marker transmitting information to an HMD can include a marker broadcasting information that is received by an HMD. The marker can then be positioned within the physical environment and left to operate on its own without further interaction. In other embodiments, the marker can include additional communications interfaces, such as a wired or wireless interface, that can be used by a backend device to reconfigure or update the information to be transmitted by the marker.

In some embodiments, the marker is capable of two-way communication with an HMD using a wireless interface such as BLUETOOTH, WIFI direct, or the like to receive information from the HMD. For example, the marker could optically transmit to the HMD a request for a device ID, service account credentials, or the like. The optical transmission could include details for connecting to the marker via another communication protocol, and the HMD can use this communication protocol to provide the requested information. The marker could in turn optically transmit to the HMD content for display based on the received information.

FIG. 1 illustrates an example system 100 according to embodiments of this disclosure. The embodiment of the system 100 shown in FIG. 1 is for illustration only. Other embodiments of the system 100 could be used without departing from the scope of this disclosure.

The system 100 includes a network 102 that can facilitate communication between various components in the system 100. For example, network 102 can communicate Internet Protocol (IP) packets or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and devices such as mobile devices 106 and 108, and markers 110. Server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each mobile device 106 and 108 represents any suitable computing or processing device that interacts with at least one server or other computing device(s) over the network 102. In this example, the mobile devices 106 and 108 include an HMD 106 and a mobile phone 108 (such as a smartphone). However, any other or additional mobile devices could be used in the system 100. For simplicity, examples in this disclosure will refer to the HMD 106, but it is understood that any suitable mobile device, such as mobile phone 108, could be used with embodiments of this disclosure.

The markers 110 represent any suitable computing or processing device that can be placed in a physical environment and configured to communicate with an HMD 106. For example, a marker 110 could be a low-power, battery-powered device that communicates optically (e.g., via an LED) to an HMD 106. For example, a marker 110 could communicate with an HMD 106 using IEEE 802.15.7 visible light communication (VLC) protocols, or using IR. In some embodiments, a marker 110 is an independent device that operates without any connection to the network 102 or server 104. For example, the marker 110 can be preconfigured with data to transmit to an HMD 106, and subsequently placed in the environment of the system 100 to operate indefinitely (or until the marker 110 is removed from the system 100). In such embodiments, the marker 110 may make one way transmissions to the HMD 106, and may not be configured to receive return communications from the HMD 106. This conserves power and can allow the marker 110 to operate on battery power for long periods of time. In some embodiments, a passive marker 112 is placed in the environment of the system 100 instead of or in addition to active markers 110. For example, a passive marker 112 could include a QR code, a drawing, or an object that is recognized by the HMD 106 using computer vision.

In some embodiments, a marker 110 can additionally include communications interfaces that allow the marker 110 to receive communications from the HMD 106. For example, the marker 110 can periodically (or constantly) transmit an optical signal via an LED for receipt by nearby HMDs 106, and can receive transmissions from an HMD 106 using a different communication interface such as BLUETOOTH, WIFI direct, or the like. In some embodiments, a marker 110 that includes such two-way communications interfaces can be connected to a power source that allows for higher power operation than a battery-powered marker 110.

In this example, HMD 106 and suitable markers 110 can communicate indirectly with the network 102. For example, an HMD 106 or a marker 110 can communicate via one or more base stations 116, such as cellular base stations or eNodeBs (eNBs), or via one or more wireless access points 118, such as IEEE 802.11 wireless access points. Note that these are for illustration only and that the HMD 106 or marker 110 could communicate directly with the network 102 or indirectly with the network 102 via any suitable intermediate device(s) or network(s).

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
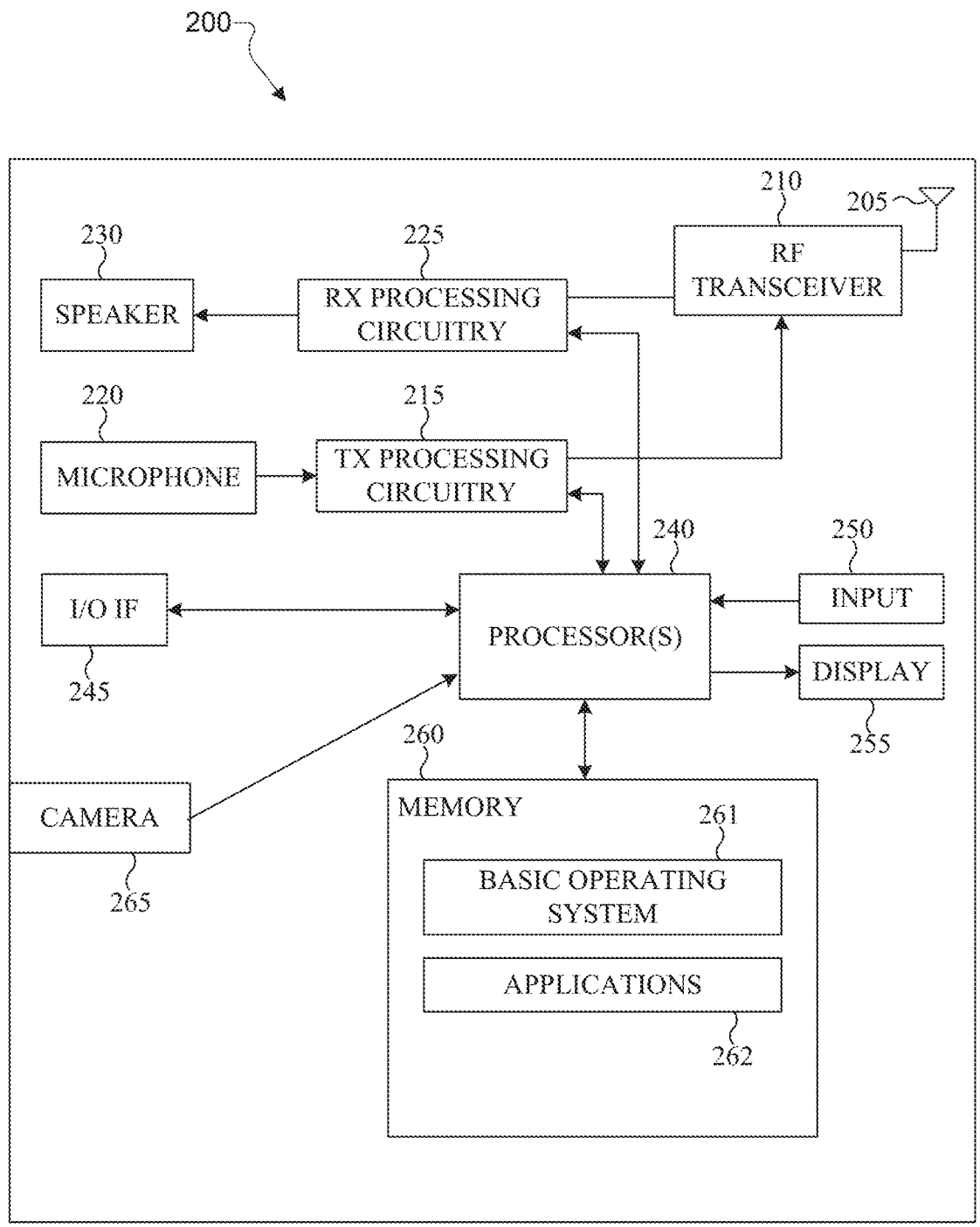
FIG. 2 illustrates an example electronic device according to embodiments of this disclosure.

FIG. 2 illustrates an example electronic device 200 according to embodiments of this disclosure. The embodiment of the electronic device 200 shown in FIG. 2 is for illustration only and other embodiments could be used without departing from the scope of this disclosure. The electronic device 200 can come in a wide variety of configurations, and FIG. 2 does not limit the scope of this disclosure to any particular implementation of an electronic device. In certain embodiments, one or more of the devices 106 and 108 of FIG. 1 can include the same or similar configuration as electronic device 200.

As shown in FIG. 2, the electronic device 200 includes an antenna 205, a communication unit 210, a transmit (TX) processing circuitry 215, a microphone 220, and a receive (RX) processing circuitry 225. The communication unit 210 can include, for example, a RF transceiver, a BLUETOOTH transceiver, a WI-FI transceiver, ZIGBEE, infrared, and the like. The electronic device 200 also includes a speaker 230, a processor 240, an input/output (I/O) interface 245, an input 250, a display 255, a memory 260, one or more cameras 265, and a biometric scanner 270. The memory 260 includes an operating system (OS) 261 and applications 262.

The communication unit 210 receives, from the antenna 205, an incoming RF signal transmitted such as a BLUETOOTH or WI-FI signal from an access point (such as a base station, Wi-Fi router, Bluetooth device) of the network 102 (such as a Wi-Fi, Bluetooth, cellular, 5G, LTE, LTE-A, WiMAX, or any other type of wireless network). The communication unit 210 can down-convert the incoming RF signal to generate an intermediate frequency or baseband signal. The intermediate frequency or baseband signal is sent to the RX processing circuitry 225 that generates a processed baseband signal by filtering, decoding, or digitizing the baseband or intermediate frequency signal, or a combination thereof. The RX processing circuitry 225 transmits the processed baseband signal to the speaker 230 (such as for voice data) or to the processor 240 for further processing (such as for web browsing data and remittance).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, digitizes, or a combination thereof, the outgoing baseband data to generate a processed baseband or intermediate frequency signal. The communication unit 210 receives the outgoing processed baseband or intermediate frequency signal from the TX processing circuitry 215 and up-converts the baseband or intermediate frequency signal to an RF signal that is transmitted via the antenna 205.

The processor 240 can include one or more processors or other processing devices and execute the OS 261 stored in the memory 260 in order to control the overall operation of the electronic device 200. For example, the processor 240 could control the reception of forward channel signals and the transmission of reverse channel signals by the communication unit 210, the RX processing circuitry 225, and the TX processing circuitry 215 in accordance with well-known principles. The processor 240 is also capable of executing other applications 262 resident in the memory 260. For example, the processor 240 can execute applications 262 that perform computer vision on images or video received via camera 265. In particular, the processor 240 can execute applications 262 that detect and interpret data from markers 110 and 112, and that generate, based on the interpreted data from markers 110 and 112, content for display via display 255.

The processor 240 can include any suitable number(s) and type(s) of processors or other devices in any suitable arrangement. For example, in some embodiments, the processor 240 includes at least one microprocessor or microcontroller. Example types of processor 240 include microprocessors, microcontrollers, digital signal processors, field programmable gate arrays, application specific integrated circuits, and discrete circuitry. The processor 240 is also coupled to the I/O interface 245 that provides the electronic device 200 with the ability to connect to other devices, such as a marker 110. The I/O interface 245 is the communication path between these accessories and the processor 240.

The processor 240 is also coupled to the input 250 and the display 255. The operator of the electronic device 200 can use the input 250 to enter data or inputs into the electronic device 200. Input 250 can be a keyboard, touch screen, mouse, track ball, voice input, or other device capable of acting as a user interface to allow a user in interact with electronic device 200. For example, the input 250 can include voice recognition processing thereby allowing a user to input a voice command via microphone 220. For another example, the input 250 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. Input 250 can be associated with a camera 265 by providing additional input to processor 240. The camera can be used to capture images, such as a QR code, or video feeds, such as a series of blinks from an LED, to be processed by the electronic device 200 or passed on to a server 104 on the network. The input 250 can also include a control circuit. In the capacitive scheme, the input 250 can recognize touch or proximity.

The display 255 can be a liquid crystal display (LCD), light-emitting diode (LED) display, optical LED (OLED), active matrix OLED (AMOLED), or other display capable of rendering text and/or graphics, such as from web sites, videos, games, images, and the like. The display 255 can also be a projector. For example, a miniature projector can be used as the display 255 to project an image onto a transparent lens of an HMD for AR applications.

The memory 260 is coupled to the processor 240. Part of the memory 260 could include a random access memory (RAM), and another part of the memory 260 could include a Flash memory or other read-only memory (ROM). The memory 260 can include persistent storage (not shown) that represents any structure(s) capable of storing and facilitating retrieval of information (such as data, program code, and/or other suitable information on a temporary or permanent basis). The memory 260 can contain one or more components or devices supporting longer-term storage of data, such as a ready only memory, hard drive, Flash memory, or optical disc.

Electronic device 200 further includes one or more cameras 265 that can capture images of the physical environment surrounding the electronic device 200. In some embodiments, the camera 265 can be an infrared (IR) camera or a multi-spectrum camera. In some embodiments, one camera 265 is a multi-spectrum camera used to capture images or video for various applications, and a second camera 265 is an IR camera used to capture communications via IR from a marker 110. The camera 265 can be a still photography camera or a video camera. In some embodiments, the camera 265 could be a photodiode (i.e., a single pixel camera).

In embodiments where camera 265 is a still camera, the camera 265 can take periodic still photographs. With respect to the capture of an optical transmission from a marker 110 (for example, in the form of a blinking LED), as discussed above and below, the period of still photography can be configured to match a known period of optical transmission of the marker 110 such that a photo is taken during each time period where the LED of the marker 110 is expected to be illuminated. This allows capture of a bitstream from the marker 110, where each photo captures a bit of information from the marker 110, and where the illumination or lack of illumination indicates the value of the bit. With respect to a static marker 112 (such as a drawing, QR code, or an object in the environment), computer vision can be applied to locate and interpret markers 112 in each photograph that is taken of the environment.

In embodiments where camera 265 is a video camera, the camera 265 can capture a continuous video feed of the surrounding environment. When a marker 110's blinking LED is captured, the illumination or lack thereof can be determined and interpreted as a bit stream. Additionally, computer vision can be applied to each frame of a video stream to locate and interpret static markers 112 that are captured in the video feed.

Although FIG. 2 illustrates an example of an electronic device in a computing system, various changes can be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). In addition, as with computing and communication networks, electronic devices can come in a wide variety of configurations, and FIG. 2 does not limit this disclosure to any particular electronic device.

Figure 3:
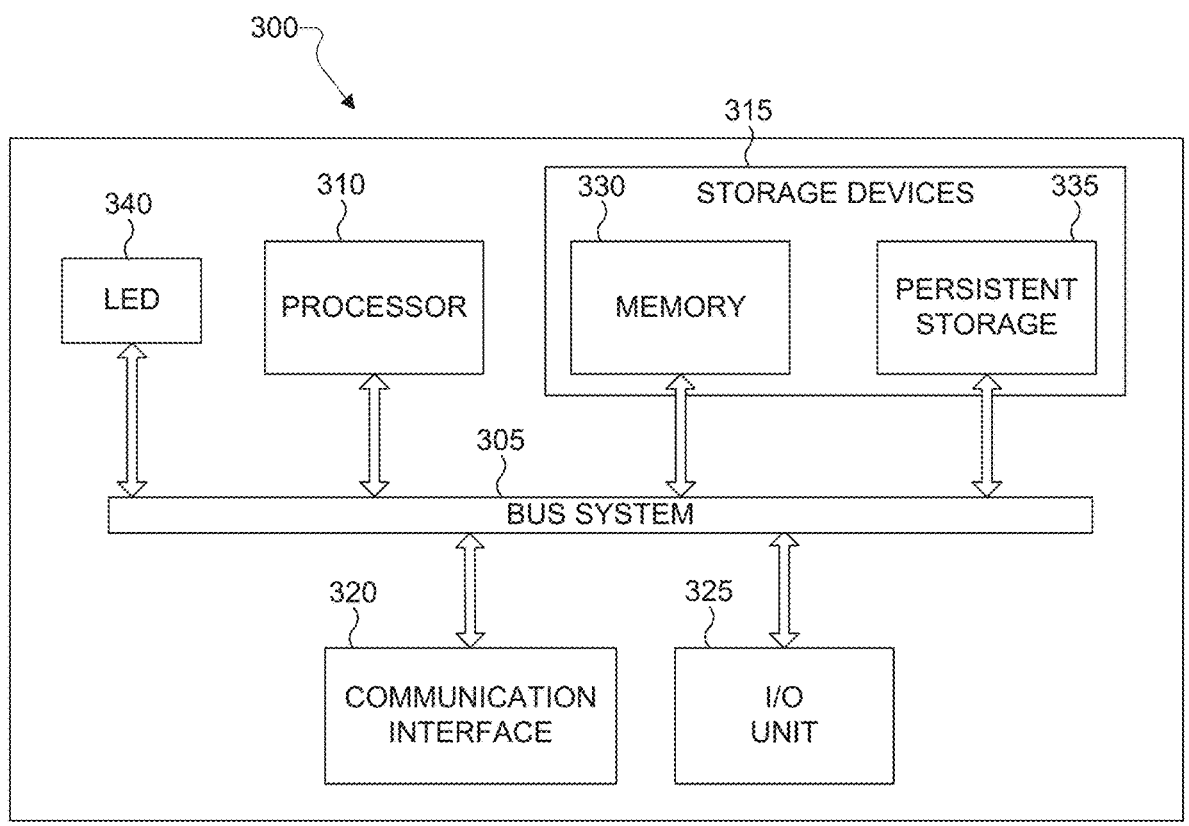
FIG. 3 illustrates an example electronic device according to embodiments of this disclosure.

FIG. 3 illustrates an example electronic device 300 according to embodiments of this disclosure. The electronic device 300 can be a marker 110 of FIG. 1. The electronic device 300 could be used to transmit and receive communications with an electronic device 200, such as an HMD 106, as will be further described below.

The electronic device 300 includes a bus system 305. The bus system 305 supports communication between at least one processor 310, at least one storage device 315, at least one communication interface 320, at least one input/output (I/O) unit 325, and a light emitting unit (e.g., an LED) 340.

The processor 310 executes instructions that may be loaded into a memory 330. For example, the processor 310 executes instructions that convert data stored in a memory 330 into a signal to be optically communicated via the light emitting unit 340. The processor 310 can include any suitable number(s) and type(s) of processors or other devices in any suitable arrangement. Example types of processors 310 include microprocessors, microcontrollers, digital signal processors, field programmable gate arrays, application specific integrated circuits, and discrete circuitry.

The memory 330 and a persistent storage 335 are examples of storage devices 315, which represent any structure(s) capable of storing and facilitating retrieval of information (such as data, program code, and/or other suitable information on a temporary or permanent basis). The memory 330 represents a random access memory or any other suitable volatile or non-volatile storage device(s). The persistent storage 335 may contain one or more components or devices supporting longer-term storage of data, such as a read only memory, hard drive, Flash memory, or optical disc. In some embodiments, data to be transmitted from the electronic device 300 to an electronic device 200 (such as an HMD 106) can be stored in a memory 260.

The communication interface 320 supports communications with other systems or devices. For example, the communication interface 320 could include a network interface card or a wireless communication unit facilitating communications over a network, such as network 102. The communication interface 320 can support communications through any suitable physical or wireless communication link(s).

The I/O unit 325 allows for input and output of data. For example, the I/O unit 325 provides a connection for user input through a keyboard, mouse, keypad, touchscreen, or other suitable input device. The I/O unit 325 also sends output to a display, printer, or other suitable output device. The I/O unit 325 could be used, for example, to facilitate pre-configuration of the marker 110 before it is deployed in a system 100.

The light emitting unit 340 allows for optical transmission of data to electronic devices 200, such as HMDs 106. In some embodiments, the light emitting unit 340 includes an infrared or visible spectrum LED and an appropriate controller for the LED, and optical communication is achieved by switching the LED between "off" and "on" states (e.g., blinking the LED). Each state of the LED can represent a state of a binary bit, and thus the LED can be used to communicate a bitstream. In some embodiments, the processor 310 executes a program stored in a storage device 315 in order to transition the state of the light emitting unit 340 at a predetermined periodic rate, which is also known by HMDs 106 that capture light from the light emitting unit 340.

Although FIG. 3 illustrates an example electronic device 300, various changes may be made to FIG. 3. For example, various components in FIG. 3 could be combined, further subdivided, or omitted and additional components could be added according to particular needs. As a particular example, the processor 310 could be divided into multiple processors, such as one or more central processing units (CPUs) and one or more graphics processing units (GPUs). In addition, computing devices can come in a wide variety of configurations, and FIG. 3 does not limit this disclosure to any particular system or device.

FIGS. 4A-8C illustrate examples of interpretation of communications from a marker by an HMD 106 according to embodiments of this disclosure. The illustrations of FIGS. 4A-8C represent the point of view of an HMD such as HMD 106 (i.e., they represent what a user of an HMD 106 would see while looking at the display or through the lenses of the HMD 106). For convenience, this and further examples of this disclosure will use an HMD 106, but it is understood that any suitable electronic device 200 could be used.

Figure 4A:
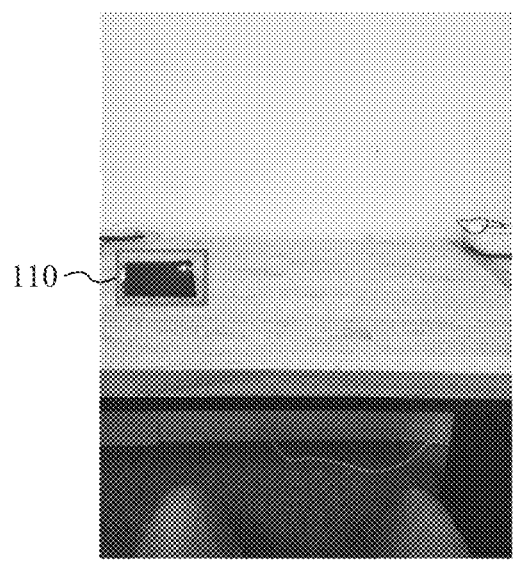
FIGS. 4A and 4B illustrate examples of interpretation of communications from a marker by an HMD according to embodiments of this disclosure.

As shown in FIG. 4A, a marker 110 is placed within an environment. In this example, the marker 110 uses a visible light LED, but it is understood that a marker 110 using an invisible spectrum LED (such as an IR LED) could be used. Alternatively, a passive marker 112 could be used. FIG. 4A represents a scenario in which the HMD 106 does not receive any interpretable data from the marker 110, or alternatively a scenario where a user is not wearing an HMD 106 at all (i.e., a scenario in which a person is viewing the environment with the naked eye). Accordingly, the marker 110 is plainly visible with no generated content overlaid on the environment as a result. A similar scenario is illustrated in FIGS. 5A, 6A, 7A, 7C, 7E, and 8A with various embodiments of markers 110 or 112.

Figure 4B:
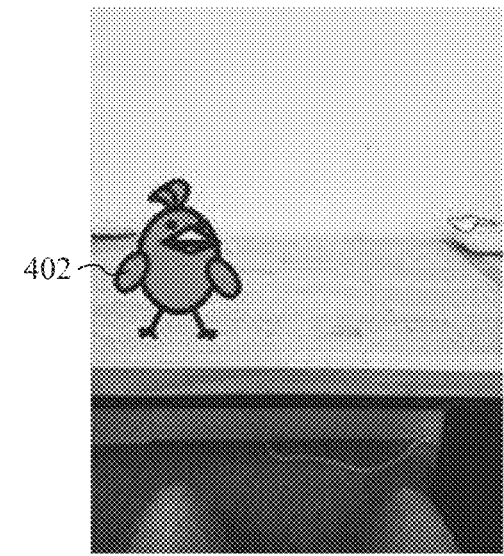

As shown in FIG. 4B, data is interpreted from the marker 110 and is used by the HMD 106 to generate content, which is displayed as object 402 within the environment. In this example the object 402 is a static 3D object, but it is understood that any suitable object could be generated based on data transmitted by the marker 110. For example, the object 402 could be an animated 2D or 3D object, a video, a text display, or the like. Furthermore, while the object (or content) 402 is displayed directly over the location of the marker 110 in this example, it is understood that the data transmitted by the marker 110 could include metadata that instructs the HMD 106 to overlay the object at a different position within the environment.

In some embodiments, data transmitted by the marker 110 to the HMD 106 could include one or more of a start code, a third party device identifier or address, image data, or metadata. For example, the start code could be a binary sequence in the communication from the marker 110 that indicates to the HMD 106 which type of data that is contained in the communication from the marker 110. That is, the start code could indicate that the data is one or more of metadata, image data, or a server address. The start code could also function to indicate to the HMD 106 that data begins to be transmitted after the start code. This could be useful if the marker 110 is continuously broadcasting the same block of data, as it allows an HMD 106 that begins to receive the transmission even if it moves into view of the marker 110 midway through the marker 110's data transmission.

Figure 5B:
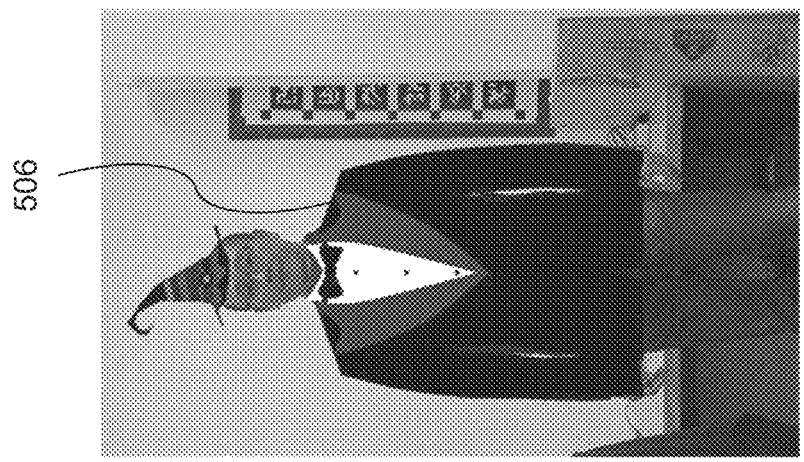
FIG. 5A and 5B illustrate examples of interpretation of communications from a portable marker that is configured to attach to a person's clothing according to embodiments of this disclosure.
Figure 5A:
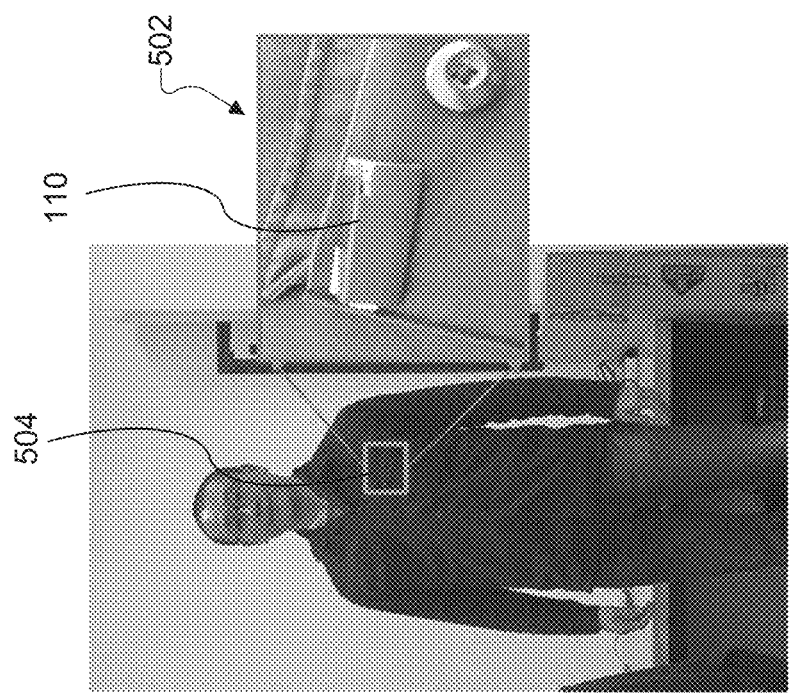

FIGS. 5A and 5B illustrate examples of interpretation of communications from a portable marker that is configured to attach to a person's clothing according to embodiments of this disclosure. View 502 is an exploded view of a portion 504 of FIG. 5A that illustrates a portable marker 110 attached to a chest pocket of a shirt. Such a marker 110 could be configured to clip or pin onto clothing. In some embodiments, marker 110 can be configured to attach to the interior of a piece of clothing, and to use a wavelength of light (such as IR light) that is not significantly attenuated by clothing, thereby providing the functionality of the marker 110 without affecting the aesthetic appearance of the clothing.

FIG. 5B illustrates an application of a portable marker 110 that is attached to a person's clothing. In this example, the marker 110 optically transmits to an HMD 106 data that includes image data for a virtual costume 506 and metadata indicating the position at which to display the virtual costume 506 with respect to the marker 110 (e.g., position a center of the virtual costume 506 a distance x to the left of the marker 110 and a distance y above the marker 110). In response to receiving the data from marker 110, the HMD 106 can generate and display the virtual costume 506 as specified by the marker 110. In other embodiments, such a marker could be used to perform a privacy function. In particular, the marker 110 could instruct an HMD 106 to blur out a location corresponding to the face of the owner of the marker 110 in any photographs or video feed that the HMD 106 takes that include the marker 110.

Figure 6A:
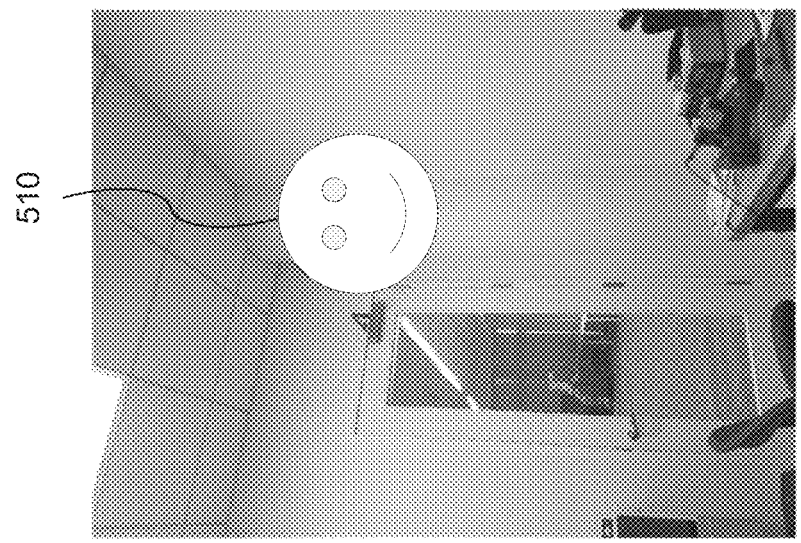
FIGS. 6A and 6B illustrate examples of interpretation of communications from a marker that is configured to attach to a wall of a room according to embodiments of this disclosure.
Figure 6B:
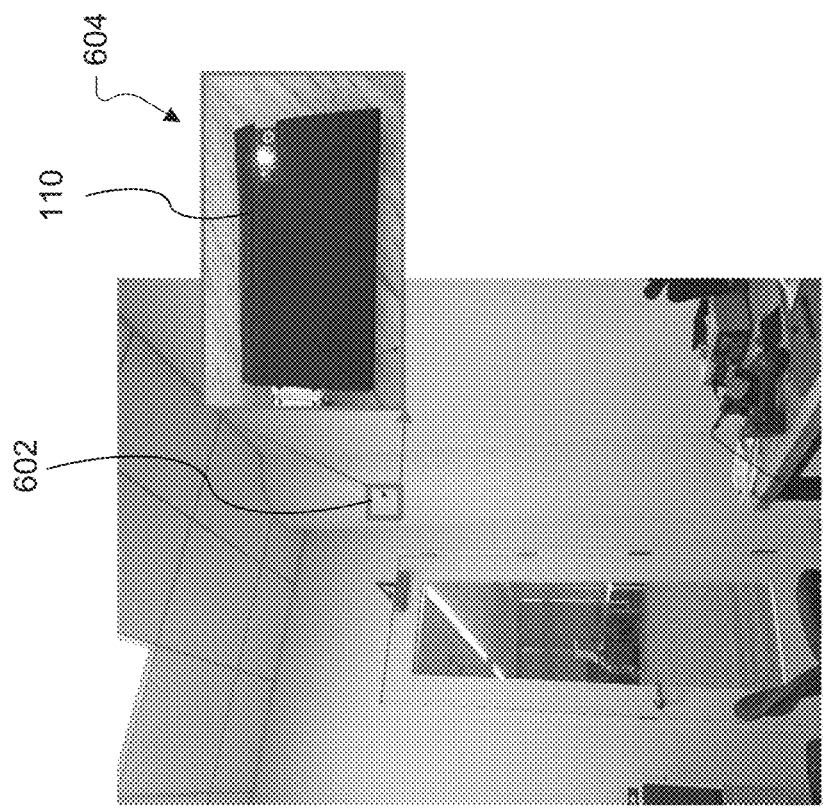

FIGS. 6A and 6B illustrate examples of interpretation of communications from a marker 110 that is configured to attach to a wall of a room according to embodiments of this disclosure. View 604 is an exploded view of a portion 602 of FIG. 6A that illustrates a portable marker 110 attached to a column. In such embodiments, the marker 110 could be configured to attach to the column or wall with a one-time-use or reusable adhesive. The marker 110 can then be easily removed and repositioned to another location.

FIG. 6B illustrates an example application of a marker 110 that is attached to a wall, column, or other similar location within a room. In this example, marker 110 optically transmits to an HMD 106 data that includes a server address for a video conferencing service (e.g., an address for a server 104). The HMD 106 interprets the server address, connects to the server, and begins an AR video conference. Based on data received from the server 104 and from the marker 110, the HMD 106 generates content 510 for display overlaid on the location of the marker 110. In this example, the content 510 represents the face of a person that is participating in the video conference. In other embodiments, the content 510 could include any suitable representation of a video conference, such as a video feed of a room at the other end of the video conference, virtual avatars of other participants in the video conference, or the like.

Figure 7B:
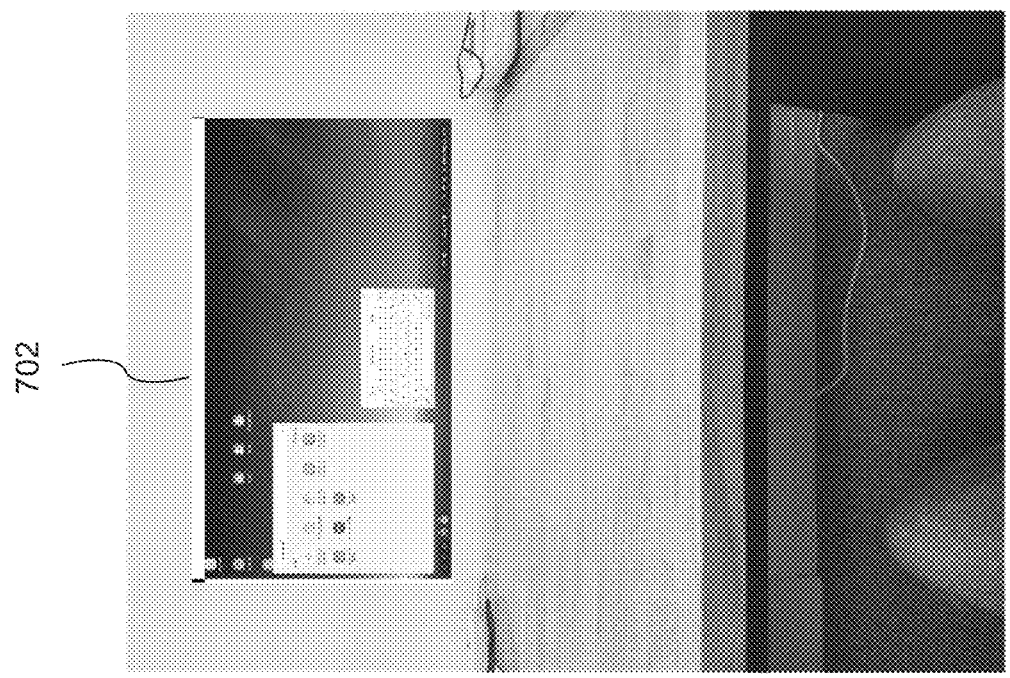
FIGS. 7A, 7B, 7C, 7D, 7E, and 7F illustrate examples of interpretation of communications from a marker that is used to generate a virtual computer desktop display on an HMD according to embodiments of this disclosure.
Figure 7A:
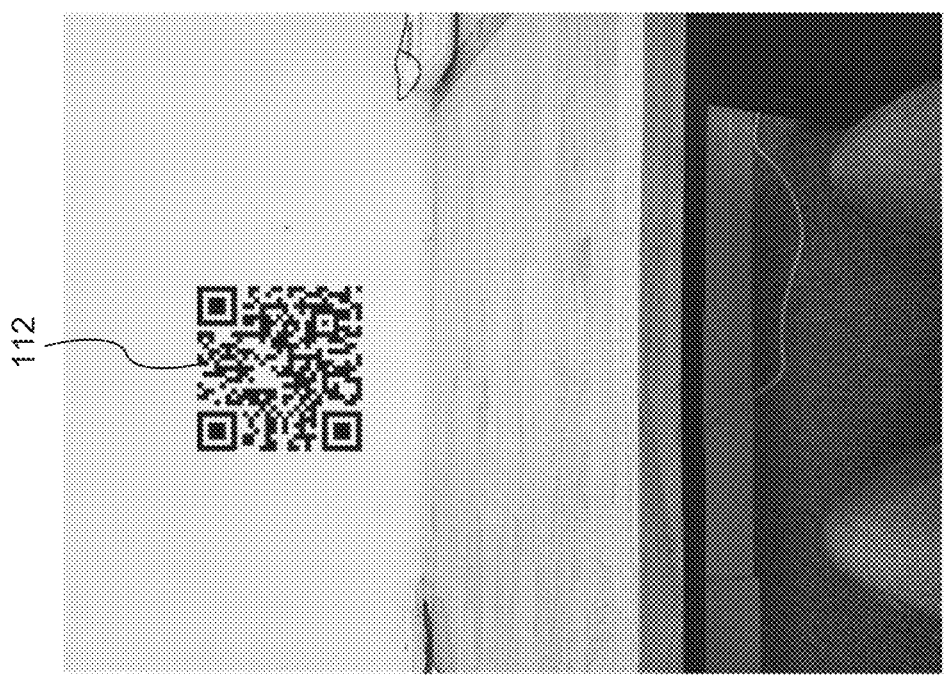

FIGS. 7A-7F illustrate examples of interpretation of communications from a marker that is used to generate a virtual computer desktop display on an HMD according to embodiments of this disclosure. As shown in FIG. 7A, a marker 112 can be presented on a wall or other surface of an environment. An HMD 106 recognizes the marker 112 and interprets it as indicating that a virtual computer desktop 702 should be generated and displayed at the location of the marker 112, as shown in FIG. 7B. In some embodiments, the marker 112 can include metadata that indicates a size and position of the virtual computer desktop 702 relative to the marker 112. While a QR code is illustrated as marker 112, it is understood that any other suitable passive marker 112 or active marker 110 could be used. The content of the virtual computer desktop 702 could be generated independently by the HMD 106 or could be indicated by the marker 112. Additionally, the marker 112 could indicate a server address for a server 104, and the content of the virtual computer desktop 702 could be generated by the server 104 and transmitted to the HMD 106.

Figure 7D:
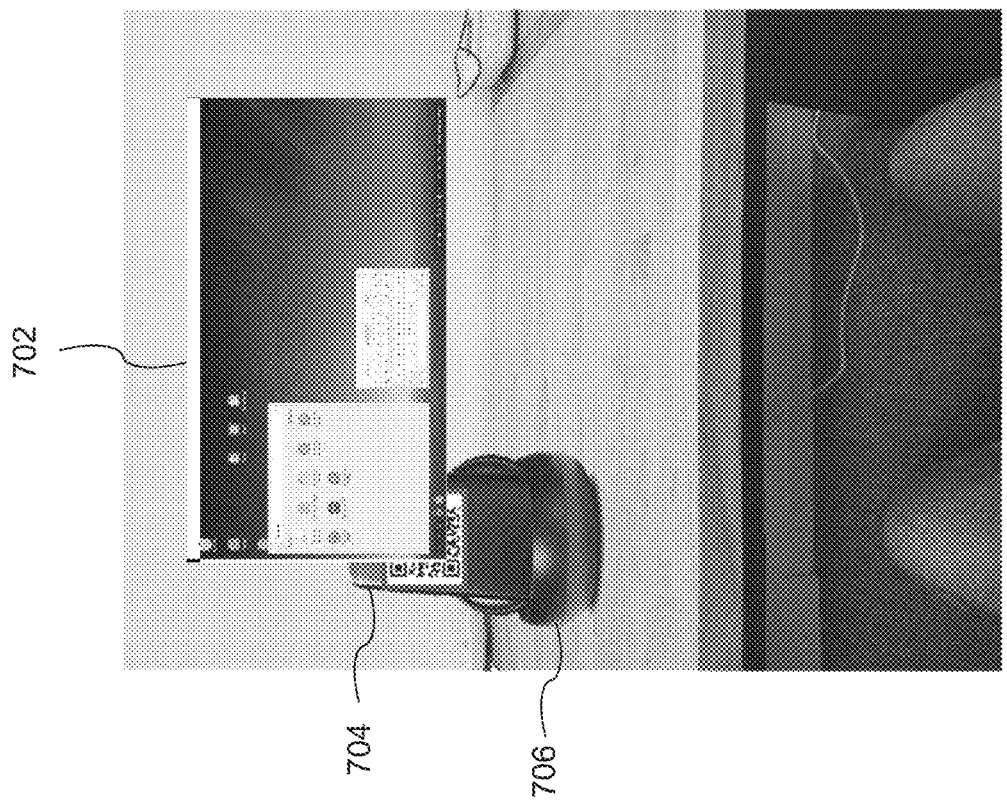
Figure 7C:
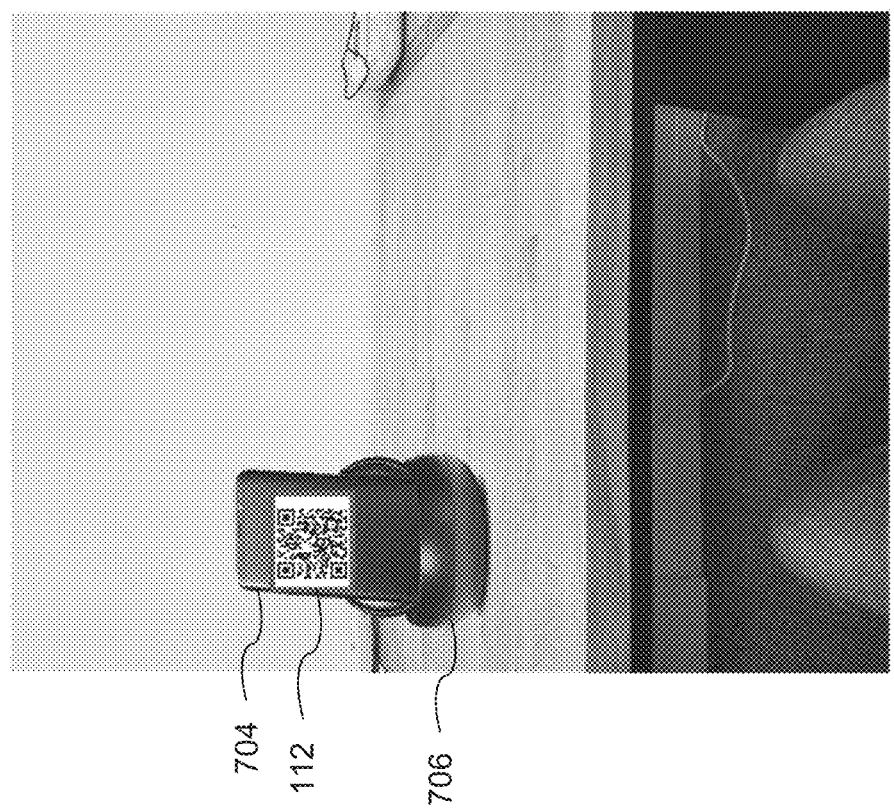

As shown in FIG. 7C, a marker 112 can be presented on a display of an electronic device 704. The electronic device 704 can dynamically generate and display the marker 112 to communicate with an HMD 106. In this example, the electronic device 704 is docked in a docking station 706. The electronic device 704 could generate the marker 112 in response to recognize that it is docked in the docking station 706. An HMD 106 recognizes the marker 112 and interprets it as instructions indicating that a virtual computer desktop 702 should be generated and displayed as shown in FIG. 7D. In the example of FIG. 7D, the electronic device 704 and its docking station 706 are located on the surface of a desk, and the marker 112 includes metadata that indicates that the virtual computer desktop 702 should be displayed at a position that appears to float above the desk and in front of the electronic device 704 and its docking station 706. Accordingly, the HMD 106 generates and displays the virtual computer desktop 702 at the designated location. In some embodiments, the marker 112 can be dynamically modified by the electronic device 704 to transmit information that causes the HMD 106 to adjust parameters of the virtual computer desktop 702, for example by changing its position or size. In some embodiments, the marker 112 includes an address of a server 104 or information that specifies a communication channel to the electronic device 704 (using, e.g., a BLUETOOTH, WIFI direct, or other communication protocol). The HMD 106 can then connect to the server 104 or the electronic device 704 to receive information used to generate content for display on the virtual computer desktop 702.

Figure 7F:
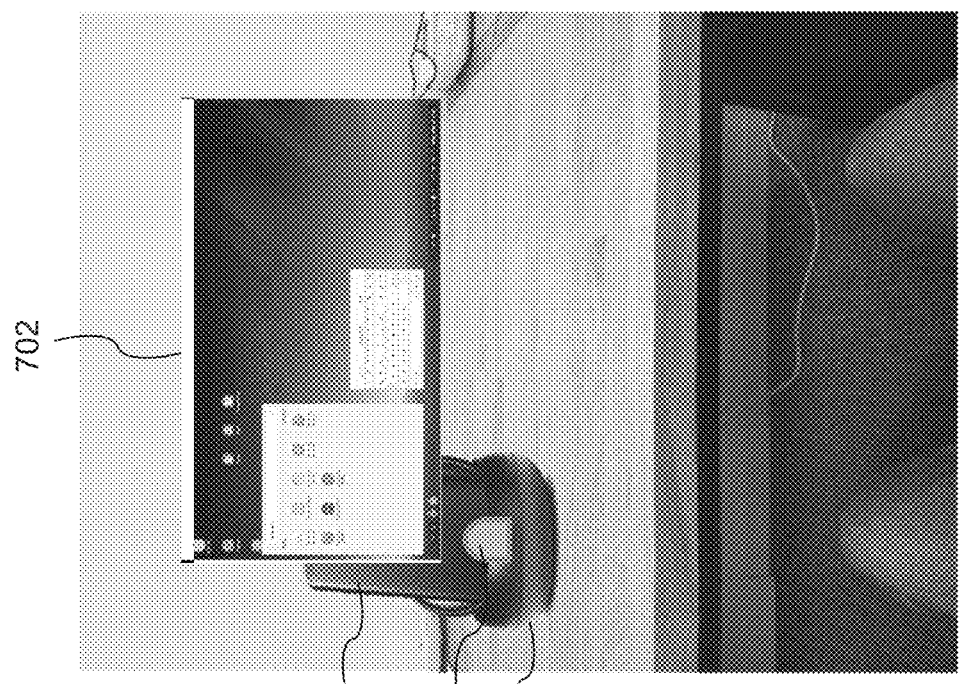
Figure 7E:
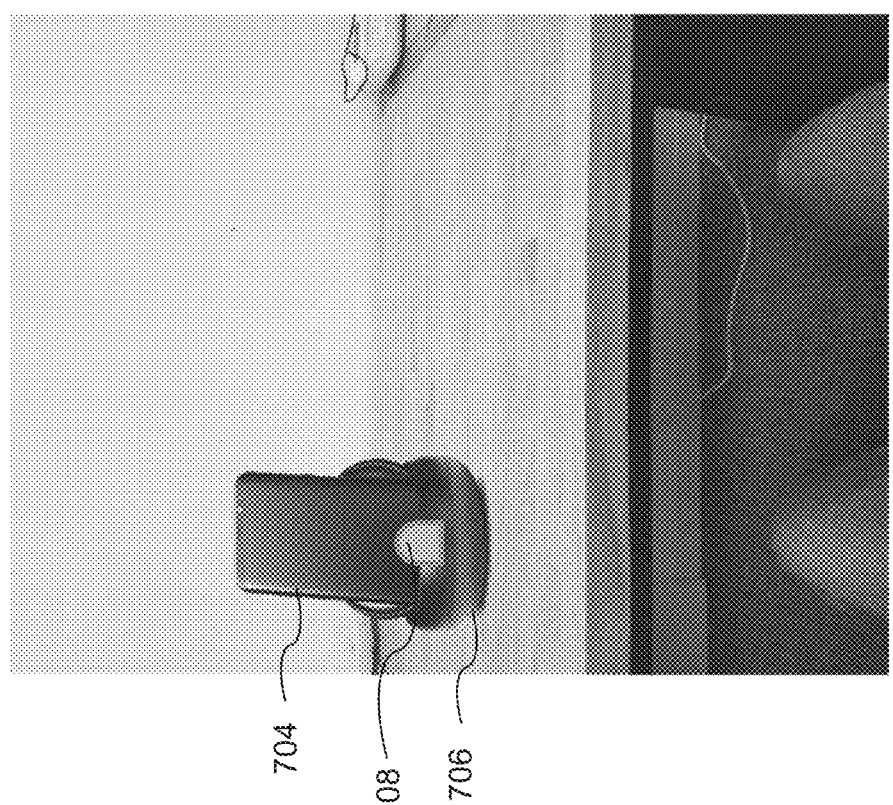

FIGS. 7E and 7F illustrate examples of a marker that is used to generate a virtual computer desktop display on an HMD, similar to the examples of FIGS. 7C and 7D, using an LED 708 rather than a passive marker 112. As illustrated in FIG. 7E, the LED 708 can be integrated with (or coupled to) the docking station 706 and can perform a function similar to or identical to an active marker 110 as described elsewhere in this disclosure. The LED 708 can, accordingly, optically broadcast data to an HMD 106 that the HMD 106 can interpret as instructions to generate and display a virtual computer desktop 702 as shown in FIG. 7F. The parameters used to generate the virtual computer desktop 702 of FIG. 7F can be similar to those used to generate the virtual computer desktop 702 of FIG. 7D.

In some embodiments, the LED 708 could be controlled by the electronic device 704 via the docking station 706. In other embodiments, the LED 708 could be controlled independently by the docking station 706, and the docking station 706 could trigger operation of the LED 708 based on connection of an electronic device 704. The data broadcast by the LED 708 could also include an SSID associated with the docking station 706, thereby providing the HMD 106 with information needed to connect to the docking station 706 via another communication protocol (e.g., BLUETOOTH, WIFI direct, etc.), and the docking station 706 could provide the HMD 106 with parameters used by the HMD 106 to generate the virtual computer desktop 702, with content for display on the virtual computer desktop 702, or both. As discussed elsewhere in the disclosure, it is understood that the LED 708 could be a visible light LED, an IR LED, or any other suitable light source.

Figure 8C:
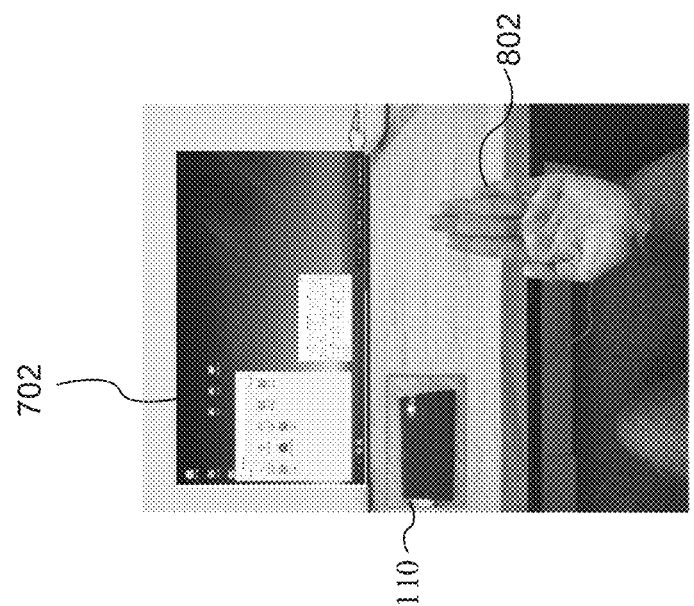
FIGS. 8A, 8B, and 8C illustrate examples of interpretation of communications from a marker that is used to generate content for display on an HMD subject to detection, by the HMD, of other events in the environment.
Figure 8B:
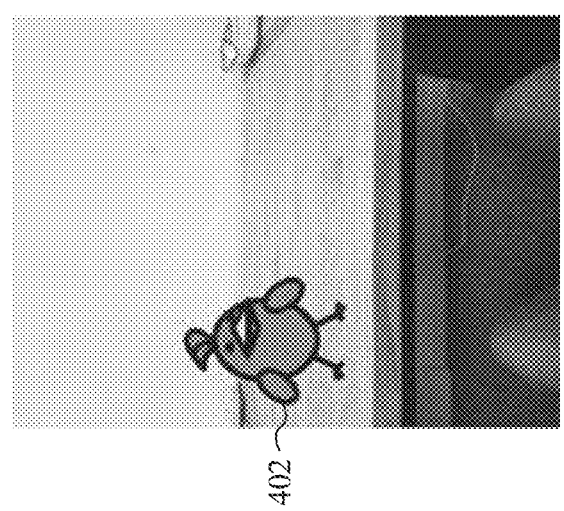
Figure 8A:
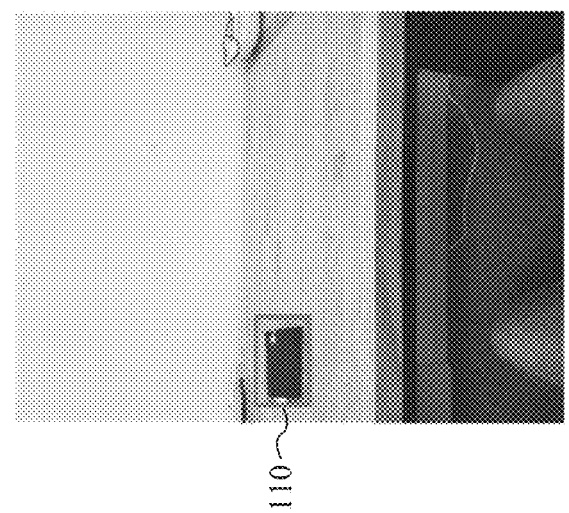

FIGS. 8A-8C illustrate examples of interpretation of communications from a marker that is used to generate content for display on an HMD subject to detection, by the HMD, of other events in the environment. FIG. 8A illustrates a marker 110 in an environment, similar to FIGS. 4A, 5A, 6A, 7A, 7C, and 7E. FIG. 8B illustrates an embodiment similar to that of FIG. 4B, in the case that the marker 110 transmits information including a third party server ID to the HMD 106. The HMD 106 connects to the server (e.g., a server 104) and receives further data that the HMD 106 uses to generate and display content 402, as described elsewhere in the disclosure. In this embodiment, the server 104 can additionally provide that a different set of content be generated and displayed if the HMD 106 detects one or more particular objects or events in the environment. For example, as illustrated in FIG. 8C, the information received from the server 104 instructs the HMD 106 that if the HMD 106 detects a hand gesture 802 then a virtual computer desktop 702 should be displayed instead of the content 402. The information received from the server 104 can include more than two alternative cases (e.g., the information can include a number of different pieces of content for display based on a number of different gestures, or based on the presence of other physical objects such as signs or furniture that are placed within the environment).

Figure 9:
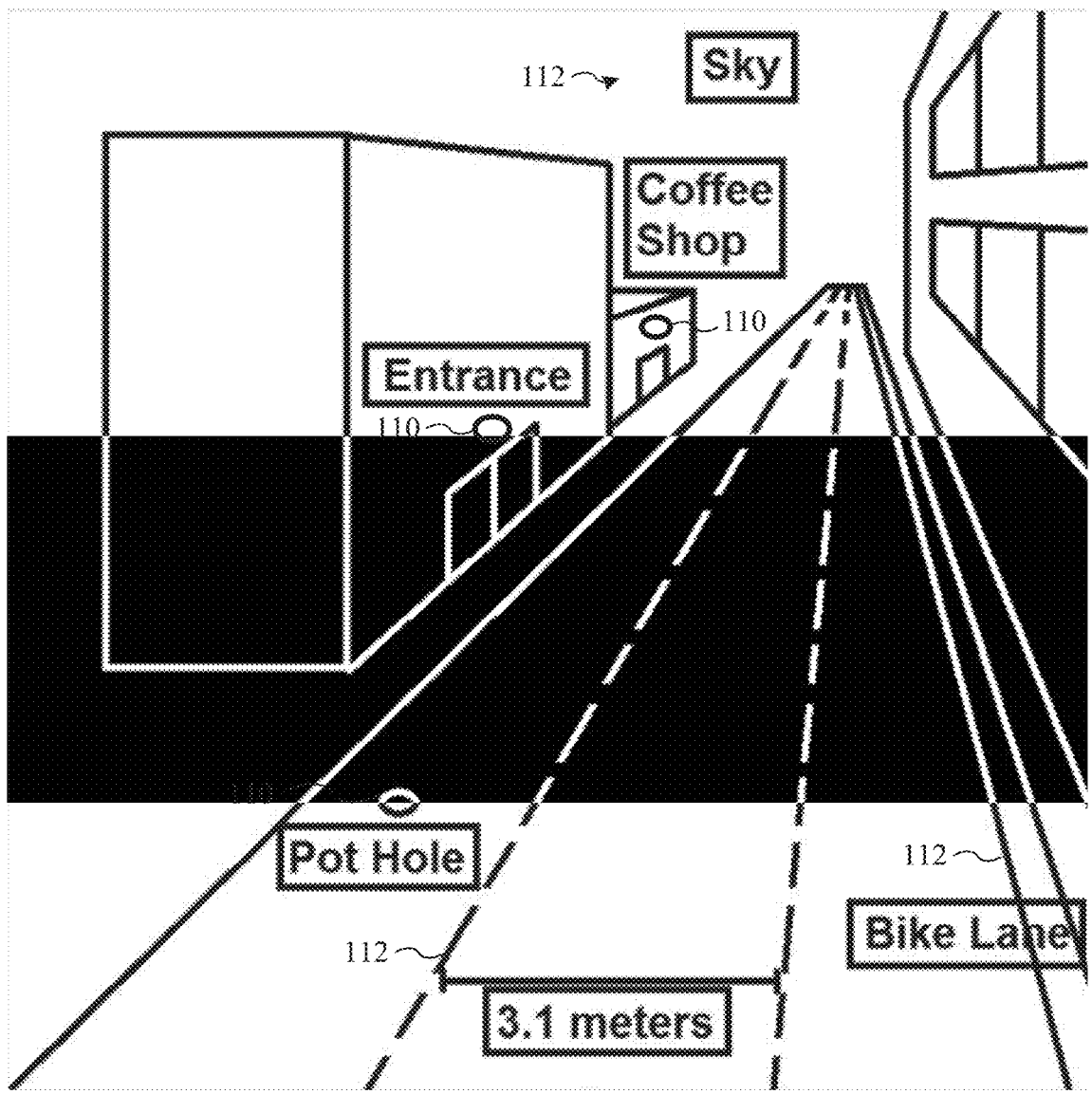
FIG. 9 illustrates an example of multiple active markers present on a city street, each providing data or metadata that instructs an HMD to display text or other content.

In some embodiments, more than one marker 110 or 112 can be present in an environment, and an HMD 106 can detect and interpret multiple markers 110 or 112 simultaneously. For example, as illustrated in FIG. 9, multiple active markers 110 could be present on a city street, each providing data or metadata that instructs the HMD 106 to display text or other content. Additionally, multiple passive markers 112 could be present in the environment, and the HMD 106 could interpret them to generate additional content for display. In this embodiment, the passive markers 112 include objects in the environment such as road lane markings, bike lane markings, and the sky. The HMD 106 can interpret images or video captured with one or more cameras of the HMD 106 (e.g., a camera 265) and demultiplexed using computer vision techniques.

Figure 10:
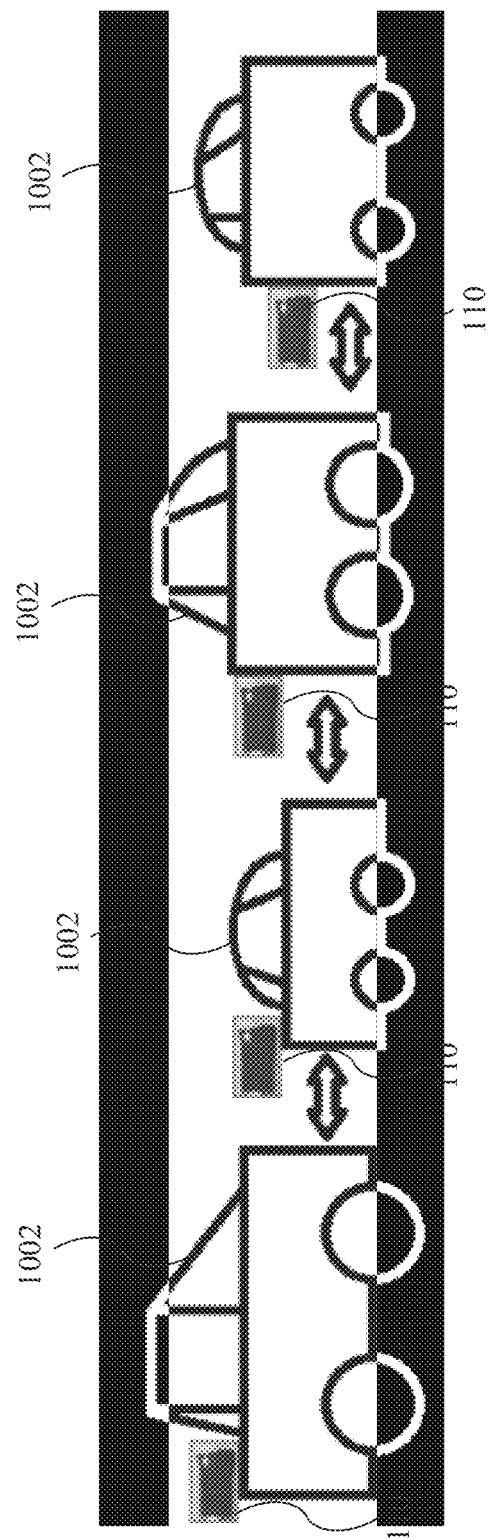
FIG. 10 illustrates an example embodiment in which markers communicate with each other to adjust the data that they transmit to an HMD.

FIG. 10 illustrates an example embodiment in which markers communicate with each other to adjust the data that they transmit to an HMD. In the example of FIG. 10, a number of vehicles 1002 on a road are equipped with markers 110 that are visible to drivers of other vehicles 1002. In this embodiment the markers 110 are shown on the rear of each vehicle 1002, but any number of markers could be used on different locations on a vehicle 1002 (such as on the front and sides of the vehicle 1002). The markers 110 can interface with onboard computing systems of the vehicle 1002 and communicate with each other using wireless transmission protocols such as IEEE 802.11, WIFI direct, or other suitable protocols. In some embodiments, the markers 110 communicate information pertaining to their vehicle 1002 to markers 110 of other vehicles 1002, which can further relay that information to other markers 110 of other vehicles 1002, thereby building a body of traffic information in each marker 110 for all vehicles 1002 within proximity to each other. This information can be used to either update onboard computing systems of other vehicles 1002 or to optically transmit the traffic information to HMDs 106 of drivers of other vehicles 1002.

Figure 11:
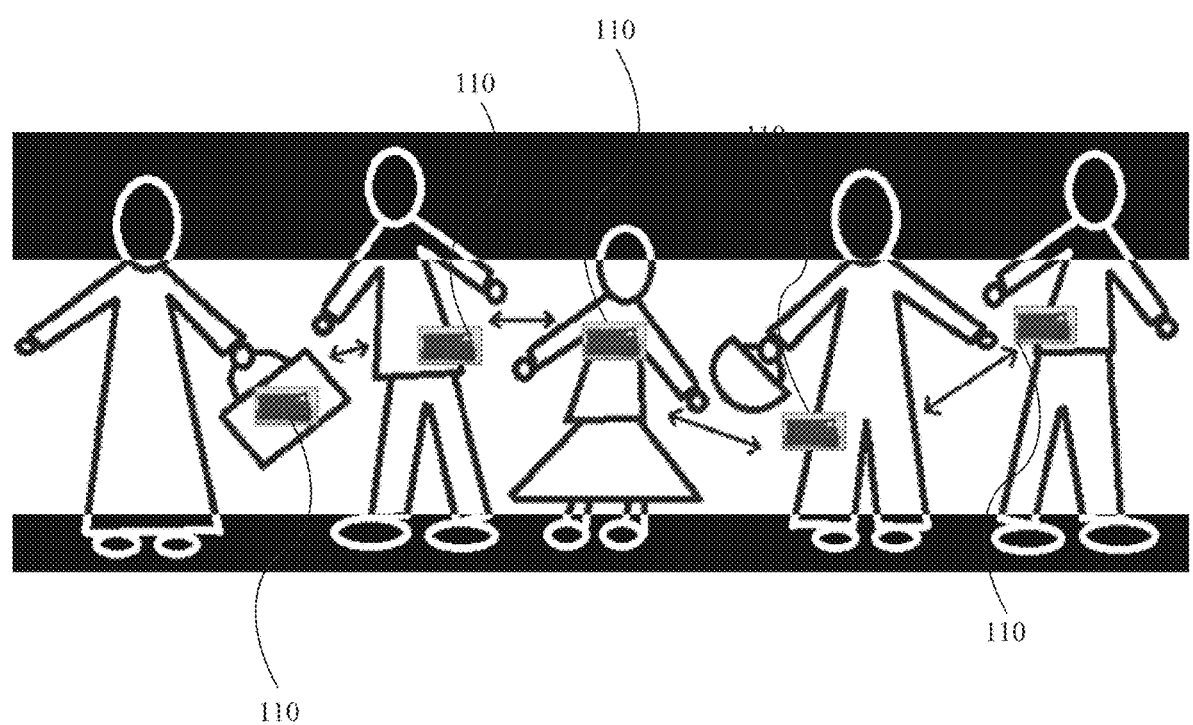
FIG. 11 illustrates another example of an embodiment in which markers communicate with each other to adjust the data that they transmit to an HMD.

FIG. 11 illustrates another example of an embodiment in which markers communicate with each other to adjust the data that they transmit to an HMD. In this embodiment, a number of people are wearing clothing-attached markers 110 that communicate with each other using wireless transmission protocols such as IEEE 802.11, WIFI direct, or other suitable protocols. The markers 110 could, for example, transmit to each other information including details of the clothing items to which the markers 110 are attached or other information about the owner of the clothing. The markers 110 can use that information for various applications, such as social networking (e.g., a marker 110 can interface with an HMD 106 to provide a user of the HMD 106 with information that allows them to compare clothing brands worn by other people wearing markers 110). Additionally or alternatively, each marker 110 can optically transmit its information to HMDs 106, thereby providing the HMDs 106 with information to display that is related to the clothing (e.g., a brand name of the clothing).

Figure 12:
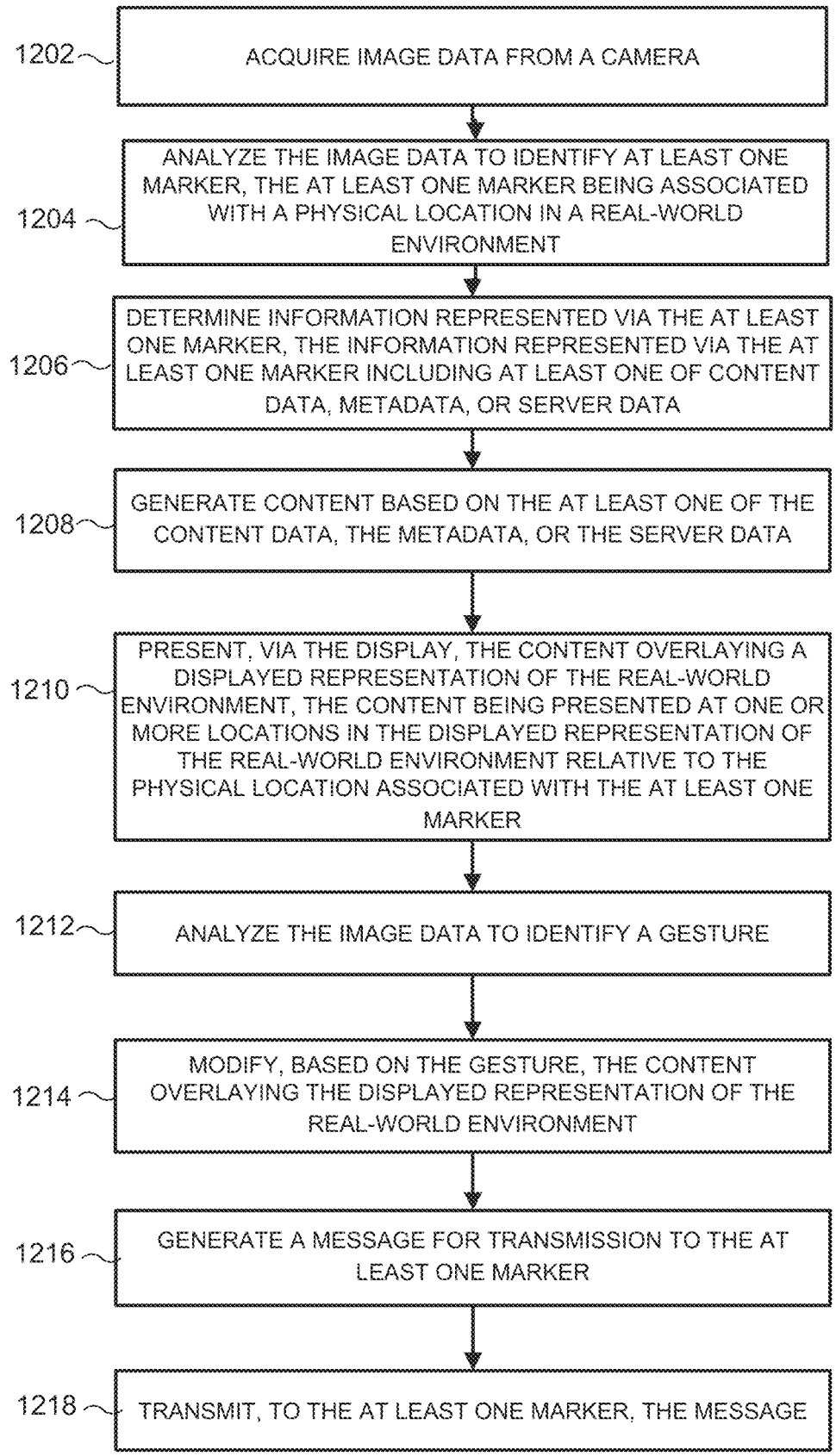
FIG. 12 illustrates an example method for a marker-based augmented reality system according to this disclosure.

FIG. 12 illustrates an example method for a marker-based augmented reality system according to this disclosure. The method could be performed using, for example, an HMD 106 and markers 110 and 112, although it is understood that any suitable electronic devices 200 and 300 could be used with the method.

Beginning at step 1202, an HMD 106 acquires image data from a camera, for example a camera 265. This image data could include still images or videos of a real-world environment around the HMD 106. In particular, the image data could include images of the real-world environment that is visible on a display of the HMD 106.

At step 1204, the HMD 106 analyzes the image data to identify at least one marker (such as a marker 110 or 112). The marker is associated with a physical location in the real-world environment surrounding the HMD 106. For example, the marker could be a passive marker 112 that is written, drawn, or printed on a surface in the real-world environment, and the camera 265 of the HMD 106 could be an RGB camera. In another example, the marker could be an active marker 110 that is attached to or embedded in a surface of the real-world environment. In this example, the marker 110 could use a visible spectrum light source and the camera 265 could be an RGB camera, or the marker 110 could use an IR spectrum light source and the camera 265 could be an IR camera.

At step 1206, the HMD 106 determines information represented via the at least one marker. The information can include at least one of content data, metadata, or server data. Content data could include details of content to be generated and displayed on a display of the HMD 106. Metadata could include parameters of the content such as size and location of the content. In some embodiments, the content data and metadata can be combined and interpreted as a whole by the HMD 106 to determine the content to display as well as size and location of the content. When the information includes server data (e.g., a server address for a server 104), the HMD 106 can connect to the identified server using any appropriate communication protocol, and can receive from the server information that is interpreted to generate content. That is, the HMD 106 receives content data and metadata from the server.

At step 1208, the HMD 106 generates content based on at least one of the content data, the metadata, or the server data. For example, the HMD 106 can interpret content data to determine the appearance of content (e.g., a 3D object, a 2D object, a text string, a video, etc.). The HMD 106 can interpret the metadata to determine other parameters of the content, such as a size of the content or a location relative to the marker (or relative to an object in the real-world physical environment) at which to display the content as an overlay on a displayed representation of the real-world physical environment. As discussed above, the HMD 106 can make these interpretations from data provided by a server that the HMD 106 identifies from server data.

At step 1210, the HMD 106 presents, via a display 255 of the HMD 106, the content overlaying a displayed representation of the real-world environment surrounding the HMD 106. The content is presented at one or more locations in the displayed representation of the real-world environment relative to the physical location that is associated with the at least one marker. The presentation location is determined as discussed in step 1208.

At step 1212, the HMD 106 analyzes the image data to identify a gesture in the image data. In the case that the information determined from the marker includes an indication that content be modified based on a gesture, the HMD 106 analyzes the image data for such a gesture. For example, the marker could indicate to the HMD 106 that certain content be displayed when an open hand is identified within a certain distance of the camera (e.g., when an open hand occupies a certain amount of an image).

At step 1214, the HMD 106 modifies, based on the identified gesture, the content overlaying the displayed representation of the real-world environment. For example, when the gesture is identified, the HMD 106 can change the content that is presented from a static 2D object to a video, or can connect to a server 104 and stream content from the server 104.

At step 1216, the HMD 106 generates a message for transmission to the at least one marker, and at step 1218 the HMD 106 transmits, to the at least one marker, the message. The HMD 106 can use any appropriate communication protocol to transmit the message to the marker. For example, the HMD 106 could use BLUETOOTH or WIFI direct to transmit the message to the marker. The message could be a response to a request for information (e.g., an identifier of the HMD 106, account information of the HMD 106 for a service related to the marker, or the like) from the marker.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A computer-implemented method comprising:
   acquiring image data from an infrared (IR) camera that captures the image data periodically, wherein a first period during which the IR camera captures the image data is configured to match a second period in which at least one marker is expected to emit IR light that functions as a bitstream;
   analyzing the image data to identify the at least one marker that emits IR light during the second period, the at least one marker being associated with a physical location in a real-world environment;
   determining information represented via the bitstream emitted by the at least one marker, the information represented via the at least one marker including at least one of metadata or server data;
   generating content based on the at least one of the metadata or the server data, including acquiring, from a server, first information representing the content as a continuous stream of data transmitted from the server, wherein the server and the information representing the content are identified via the server data; and
   presenting, via a display, the content overlaying a displayed representation of the real-world environment, the content being presented at one or more locations in the displayed representation of the real-world environment relative to the physical location associated with the at least one marker.

2. The method of claim 1, wherein the at least one marker includes at least one of a written marking, a drawn marking, or a printed marking, and wherein the camera includes a RGB camera.

3. The method of claim 1, further comprising:
   analyzing the image data to identify a gesture; and
   modifying, based on the gesture, the content overlaying the displayed representation of the real-world environment.

4. The method of claim 1, further comprising:
   generating a message for transmission to the at least one marker; and
   transmitting, to the at least one marker, the message.

5. An electronic device comprising:
   an infrared (IR) camera configured to capture image data periodically in a first period that is configured to match a second period in which at least one marker is expected to emit IR light that functions as a bitstream;
   a display; and
   a processor operably coupled to the camera and the display, the processor configured to:
   acquire the image data from the camera;
   analyze the image data to identify the at least one marker that emits IR light during the second period, the at least one marker being associated with a physical location in a real-world environment;
   determine information represented via the bitstream emitted by the at least one marker, the information represented via the at least one marker including at least one of metadata or server data;
   generate content based on the at least one of the metadata or the server data, wherein the processor is configured to acquire, from a server, first information representing the content as a continuous stream of data transmitted from the server, wherein the server and the information representing the content are identified via the server data; and
   present, via the display, the content overlaying a displayed representation of the real-world environment, the content being presented at one or more locations in the displayed representation of the real-world environment relative to the physical location associated with the at least one marker.

6. The electronic device of claim 5, wherein the at least one marker includes at least one of a written marking, a drawn marking, or a printed marking, and wherein the camera includes a RGB camera.

7. The electronic device of claim 5, wherein the processor is further configured to:
   analyze the image data to identify a gesture; and
   modify, based on the gesture, the content overlaying the displayed representation of the real-world environment.

8. The electronic device of claim 5, wherein the processor is further configured to:
   generate a message for transmission to the at least one marker; and
   transmit, to the at least one marker, the message.

9. A non-transitory computer readable medium embodying a computer program, the computer program comprising computer readable program code that when executed causes at least one processor to:

acquire image data from an infrared (IR) camera that captures the image data periodically, wherein a first period during which the IR camera captures the image data is configured to match a second period in which at least one marker is expected to emit IR light that functions as a bitstream;

analyze the image data to identify the at least one marker that emits IR light during the second period, the at least one marker being associated with a physical location in a real-world environment;

determine information represented via the bitstream emitted by the at least one marker, the information represented via the at least one marker including at least one of metadata or server data;

generate content based on the at least one of the metadata or the server data, wherein the computer readable program code when executed further causes the at least one processor to acquire, from a server, first information representing the content as a continuous stream of data transmitted from the server, wherein the server and the information representing the content are identified via the server data; and present, via a display, the content overlaying a displayed representation of the real-world environment, the content being presented at one or more locations in the displayed representation of the real-world environment relative to the physical location associated with the at least one marker.

10. The non-transitory computer readable medium of claim 9, wherein the at least one marker includes at least one of a written marking, a drawn marking, or a printed marking, and wherein the camera includes a RGB camera.

11. The non-transitory computer readable medium of claim 9, wherein the computer readable program code when executed further causes the at least one processor to:

analyze the image data to identify a gesture; and modify, based on the gesture, the content overlaying the displayed representation of the real-world environment.

* * * * *